United States Patent [19]

Lewis

[11] Patent Number: 4,629,870
[45] Date of Patent: Dec. 16, 1986

[54] TAMPER PROOF ODOMETER

[76] Inventor: Gerald F. Lewis, 710 S. U.S. 23, Harrisville, Mich. 48740

[21] Appl. No.: 770,262

[22] Filed: Aug. 28, 1985

[51] Int. Cl.⁴ .............................................. G01C 22/00
[52] U.S. Cl. .................. 235/96; 235/131 R; 235/1 C
[58] Field of Search ............... 235/95 R, 95 B, 95 C, 235/96, 131 R, 131 M, 131 JA, 1 C

[56] References Cited

U.S. PATENT DOCUMENTS

| | | | |
|---|---|---|---|
| 3,516,603 | 6/1970 | Hachtel | 235/95 R |
| 3,539,783 | 11/1970 | Bergsma et al. | 235/96 |
| 3,544,002 | 12/1970 | Summerer et al. | 235/96 |
| 3,785,551 | 1/1974 | Regan | 235/95 R |
| 3,880,351 | 4/1975 | Bogart | 235/95 R |
| 3,949,201 | 4/1976 | Bogart | 235/95 R |
| 3,949,202 | 4/1976 | Bogart | 235/95 R |
| 4,267,438 | 5/1981 | Regan | 235/96 |
| 4,284,882 | 8/1981 | Woodward | 235/96 |

Primary Examiner—Benjamin R. Fuller
Attorney, Agent, or Firm—Irvin L. Groh

[57] ABSTRACT

A tamper resistant and tamper-proving odometer construction. Driving of the odometer mechanism in the reverse direction to lower the count is prevented by a one-way locking mechanism associated with the lowest order digit wheel. A marking mechanism is associated with the two highest order digit wheels to clearly indicate if tampering has taken place in the lower mileage range up to 10,000 miles and in the higher mileage range up to 100,000. A continuous drive between the two highest order wheels can also be used to indicate tampering in the range below 10,000 miles.

5 Claims, 4 Drawing Figures

TAMPER PROOF ODOMETER

Many devices have been used to indicate that an odometer has been tampered by lowering the mileage count. For example, Bogart U.S. Pat. Nos. 3,880,351; 3,949,201 and 3,949,202 show various devices for marking the highest order digit wheel such as by crushing, grinding and removing a layer from the wheel periphery. Bergsma et al U.S. Pat. No. 3,539,783 uses an indelible ink marker on the highest order digit wheel.

Other devices employ means for rendering the odometer inoperative when tampering is attempted. In Regan U.S. Pat. No. 4,267,438, the drive shaft for the digit wheels breaks apart upon attempted tampering, and in Woodward U.S. Pat. No. 4,284,882, the pinion gear and shaft fractures disengaging all of the digit wheel pinion gears.

Still other devices have been designed to prevent tampering such as Hachtell U.S. Pat. No. 3,516,603 which provides a one-way drive.

Likewise, combination devices have been developed such as Summerer et al U.S. Pat. No. 3,544,002 which provides a transparent cylinder concentrically located around the digit wheels to prevent tampering, and if broken to discharge a volatile dye solution changing color or clouding the view area indicating tampering. Regan U.S. Pat. No. 3,785,551 combines the Hachtell device discussed above to prevent decrementing of the counter with end caps on the digit wheel shaft to prevent disassembly.

All of the foregoing prior art devices indicare to some extent that tampering has taken place, or prevent certain types of tampering. It is an object of this invention to provide a device which absolutely will indicate tampering in the lower mileage range below 10,000 miles, and in the higher mileage range up to 100,000 miles.

It is another object of rhis invention to combine such a dual indication of low or high mileage tampering with a device which prevents decrementing of the odometer to produce a lower mileage setting.

It is still another object of the invention to provide an additional means of indicating tampering in the lower mileage range.

The foregoing objects of this invention are accomplished in an odometer having a plurality of aligned digit wheels which are mounted on a common shaft for rotation to display a mileage count. Each wheel is movable at a decimal ratio of its adjacent wheel. A digit viewing window displays one digit of each wheel. Marking means, preferably in the form of scribe points, leave an indicia on the two highest order wheels as they are advanced past their viewing windows. Means is provided in association with one of the lower order wheels, preferably the lowest order wheel, for preventing rotation of that digit wheel in a direction to decrement the displayed count.

Preferably, the device for preventing decrementing of the display count includes a cam-shaped groove contiguous to the periphery of the lowest order digit wheel and a ball contained within the groove which permits free movement of the wheel in a normal, incrementing, direction. When an attempt is made to reverse the direction of the wheel, the ball moves in the cam-shaped groove to lock the wheel against movement in the decrementing direction. Preferably, the device contains two cam-shaped groove and ball devices contiguous to the periphery of the lowest order wheel located on diametrically opposite sides of the wheel to assure that locking occurs with at least one ball regardless of the position in which the odometer is held. This prevents an attempt to defeat the locking mechanism by removing the odometer from its normal position and holding it in a position to overcome the locking force.

The scribing on the second highest order wheel indicates if any change has been made in the lower mileage range up to 10,000 miles, while marking on the highest order digit wheel indicates any tampering to lower the count up to 100,000 miles. Additionally, in the preferred form, I provide a continuous drive between the two highest order wheels so that marking on the highest order wheel commences with the initial movement of the second highest order wheel, providing further evidence of tampering in the lower mileage range.

The objects of the invention are accomplished by the embodiment disclosed in the following description and illustrated in the drawings in which.

Figure 1:
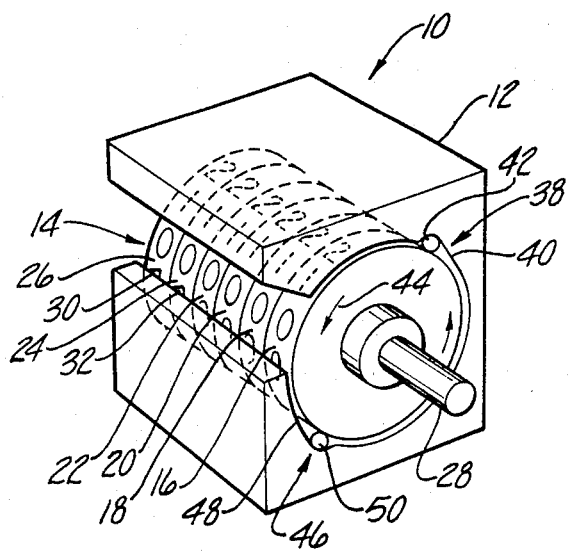
FIG. 1 is a perspective view of the odometer showing six digit wheels for presenting accumulative mileage from one-tenth of a mile to 100,000 miles and showing the device for preventing decrementing of the displayed count associated with the lowest order digit wheel.

Odometer 10 includes a housing 12 containing a plurality of digit wheels which display the accumulated mileage through viewing window 14. Digit wheels 16, 18, 20, 22, 24 and 26 display mileage from zero to 100,000 miles, or 99,999.9 miles, with digit wheel 16 being of the lowest order presenting tenths of a mile, digit wheel 18 presenting miles, digit wheel 20 presenting tens of miles, digit wheel 22 presenting hundreds of miles, digit wheel 24 being the second highest order wheel presenting thousands of miles, and digit wheel 26 being the highest order digit wheel presenting ten thousand's of miles.

The digit wheels are mounted on a common shaft 28 with conventional gearing between adjacent digit wheels so that when a lower order wheel has received a complete rotation, the next higher adjacent digit wheel will be rotated a distance sufficient to display the next digit. This conventionally occurs during the last tenth of the rotation of the adjacent lower digit wheel.

Associated with the two highest order digit wheels 26 and 24 are marking scribes 30 and 32. These scribes are positioned adjacent the viewing window 14 so that scribe 32 will commence marking the periphery of the 1,000 mile digit wheel 24 when it is advanced from zero to one with the initial marking occurring through the zero as it leaves the viewing window 14 and such marking will not be visible to the operator. Likewise, marking of the highest order digit wheel 26 with scribe 30 does not occur until the one digit starts to appear, indicating 10,000 miles as the nine digit of the one thousand mile digit wheel 24 passes out of view. This will cause marking on the highest order digit wheel 26 through the zero digit at the same time that marking occurs on the periphery of the second highest order digit wheel 24 as marking occurs through the nine digit completing marking around the entire periphery of wheel 24.

Figure 2:
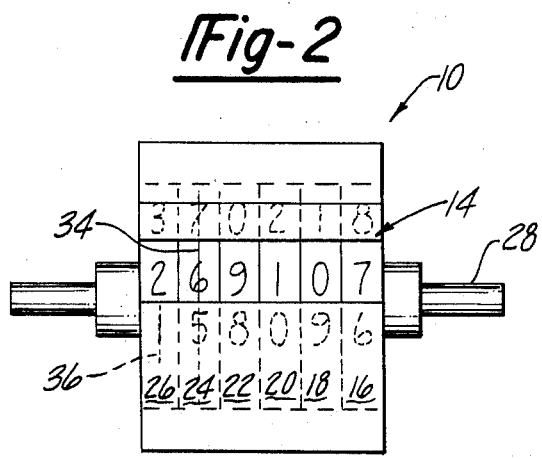
FIG. 2 is a plan view showing an arbitrary mileage setting and the marking which has occurred on the periphery of the two highest order digit wheels.

By way of example, the accumulative mileage reading shown on odometer 10 in FIG. 2 is 26,910.7 miles, at which point the marking line 34 created by scribe point 32 on the periphery of the one thousand mile digit wheel 24 has passed around the entire periphery of the wheel passing through each digit, while the marking line 36 occurring on the periphery of the highest order digit wheel 26 will have only passed through and marked the zero and one digit. Thus, any lowering of the accumulated mileage on the odometer in the lower mileage range up to 10,000 miles would have been readily apparent by comparing the setting viewed in window 14 of wheel 24 with the extent of the mark 34 along the periphery of digit wheel 24. This lower mileage tamper indication is not available on the prior art odometers. Likewise, the extent to which the accumulated mileage may have been decremented in the mileage range from 10,000 to 100,000 miles will be indicated by the extent of marking line 36 on the highest digit wheel 26.

For use with the tamper indicating feature on the two highest digit wheels is locking device 38 associated with the lowest digit wheel 16. Locking device 38 includes a cam-shaped groove 40 contiguous to the periphery of the lowest order digit wheel 16 containing a ball 42 which freely rotates with digit wheel 16 in the normal incrementing direction as shown by arrows 44. When an attempt is made to turn back the mileage or decrement the total accumulated amount, the ball 42 wedges in cam groove 40 against wheel 16 preventing such rotation. In order to prevent attempts to defeat this locking action by removing the odometer from its normal dashboard mounting and tilting the housing 12, a second locking device 46 is provided on the diametrically opposite side of wheel 16 in the form of cam-shaped groove 48 and ball 50 acting in the same manner as locking device 38. The use of the second locking device 46 assures that one or the other of locking devices 38 or 46 will immediately lock rotation in the reverse direction regardless of the orientation of housing 12.

Figure 3:
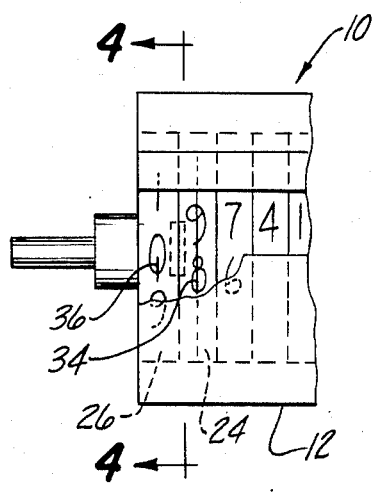
FIG. 3 is a fragmentary plan view similar to FIG. 2 showing the marking of the two highest order digit wheels in an embodiment of the invention further shown in FIG. 4 providing continuous movement of the highest order digit wheel.
Figure 4:
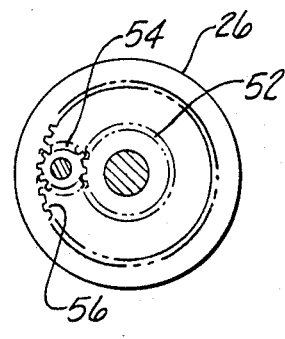
FIG. 4 is a sectional view taken along line 4—4 of FIG. 3 showing the embodiment providing continuous movement of the highest order digit wheel.

As a further protection for detecting lower mileage tampering, the embodiment of FIGS. 3 and 4 provide through spur gear 52 associated with the second highest order digit wheel 24, intermediate spur gear 54 and ring gear 56 associated with highest order digit wheel 26, a means for advancing the highest digit wheel with any movement of the second highest digit wheel 24. This is illustrated in FIG. 3 where the digit 9 appears in the second highest order digit wheel having scribed the mark 34 through previous digits up to the number 8 on the second highest digit wheel 24 while the marking line 36 has already commenced marking through the 0 digit as digit wheel 26 is continuously advanced by rotation each time wheel 24 is incremented by one digit. This provides additional evidence of tampering when the odometer has been reset to a lower mileage reading below 10,000 miles, and a more precise reading of the total mileage on the highest digit wheel 26 is indicated by the extent of the marking 36 on this wheel.

The embodiments of the invention in which an exclusive property or privilege is claimed are defined as follows:

1. An odometer comprising: a plurality of alignedf digit wheels mounted on a common shaft for rotation to display a count, each wheel movable at a decimal ratio of the other wheels; a digit viewing window displaying one digit of each wheel; marking means adjacent the two highest order wheels for leaving an indicia on these wheels as they are advanced past said viewing window; and means associated with one of the lower order wheels for preventing rotation of that digit wheel in a direction to decrement the displayed count, including a cam-shaped groove contiguous to the periphery of said one of the lower order digit wheels and a ball contained therein which permits free movement in an incrementing direction, but which moves in said cam-shaped groove to lock said wheel against movement in the decrementing direction.

2. The odometer according to claim 1 further including a second cam-shaped groove and ball contained therein contiguous to the periphery of said lower order digit wheel, said grooves being located on diameterically opposite sides of said wheel to assure locking of one of said balls regardless of the position in which said odometer is held.

3. An odometer comprising: a plurality of aligned digit wheels mounted on a common shaft for rotation to display a count, each wheel movable at a decimal ratio of the other wheels; a digit viewing window displaying one digit of each wheel; scribe points located adjacent to said viewing window and directed toward the two highest order wheels for cutting a groove on said wheels as the wheels are advanced past said viewing window; and means associated with one of the lower order wheels for preventing rotation of that digit wheel in a direction to decrement the display count.

4. The odometer of claim 3 wherein said scribe points are positioned to cut a groove on said wheels only when said wheels are rotated in one direction.

5. The odometer of claim 3 wherein the drive between the two highest order of wheels is continuous so that as the second highest order wheel is marked, the highest order wheel is also marked.

* * * * *